United States Patent [19]

Myron et al.

[11] 4,231,843
[45] Nov. 4, 1980

[54] GUIDE TUBE FLOW DIFFUSER

[75] Inventors: Donald L. Myron, Pensacola; Robert T. Berringer, Gulf Breeze, both of Fla.

[73] Assignee: Westinghouse Electric Corp., Pittsburgh, Pa.

[21] Appl. No.: 821,101

[22] Filed: Aug. 2, 1977

[51] Int. Cl.² .............................................. G21C 15/00
[52] U.S. Cl. .................................... 176/50; 176/36 R
[58] Field of Search ..................... 176/50, 61, 38, 35, 176/36 R, 86 R, 43

[56] References Cited

U.S. PATENT DOCUMENTS

| | | | |
|---|---|---|---|
| 3,075,909 | 1/1963 | Haass | 176/61 |
| 3,346,459 | 10/1967 | Prince et al. | 176/36 R |
| 3,432,390 | 3/1969 | Dean et al. | 176/43 |
| 3,481,832 | 12/1969 | Rickert | 176/86 R |
| 3,595,748 | 7/1971 | Frisch et al. | 176/36 R |
| 3,607,629 | 9/1971 | Frisch et al. | 176/36 R |
| 3,940,311 | 2/1976 | Frisch et al. | 176/36 R |
| 4,064,002 | 12/1977 | Desmarchais et al. | 176/50 |
| 4,076,586 | 2/1978 | Bideau et al. | 176/78 |
| 4,080,257 | 3/1978 | Machado et al. | 176/87 |
| 4,106,983 | 8/1978 | Meuschke et al. | |

OTHER PUBLICATIONS

"Combustion", 2/70, vol. 41, No. 8, pp. 8–14.

Primary Examiner—Harvey E. Behrend
Attorney, Agent, or Firm—L. A. DePaul; Z. L. Dermer

[57] ABSTRACT

Nuclear reactor upper internal guide tube having a flow diffuser integral with its bottom end. The guide tube provides guidance for control rods during their ascent or descent from the reactor core. The flow diffuser serves to divert the upward flow of reactor coolant around the outside of the guide tube thereby limiting the amount of coolant flow and turbulence within the guide tube, thus enhancing the ease of movement of the control rods.

1 Claim, 6 Drawing Figures

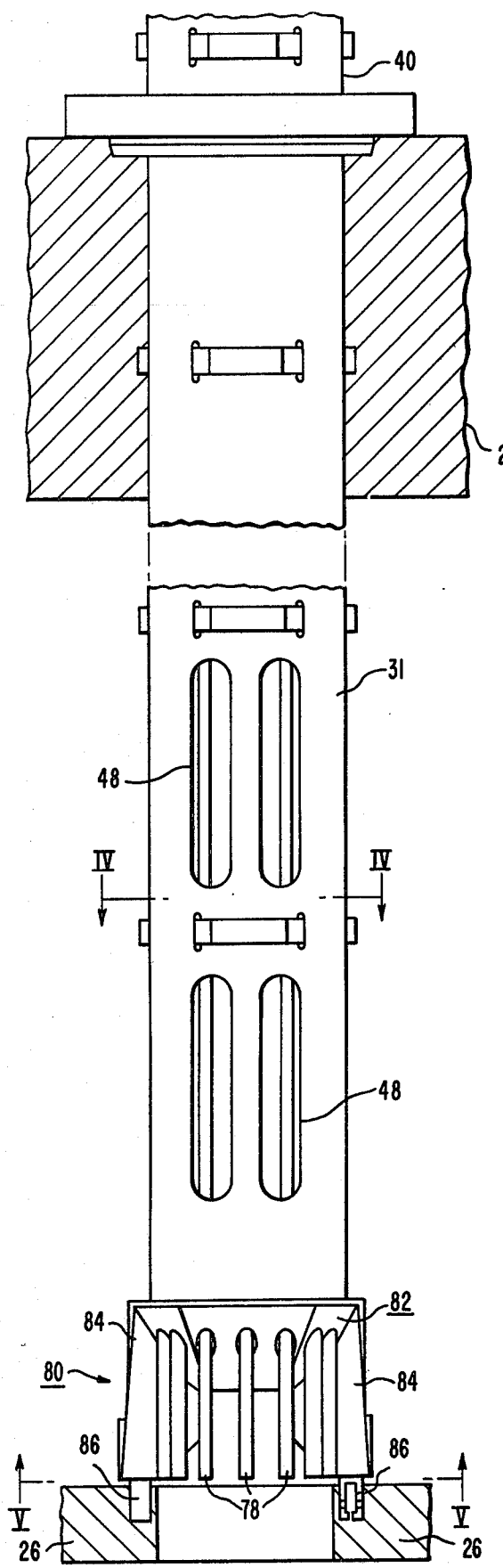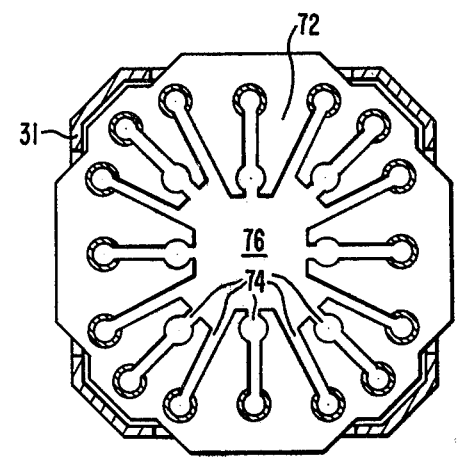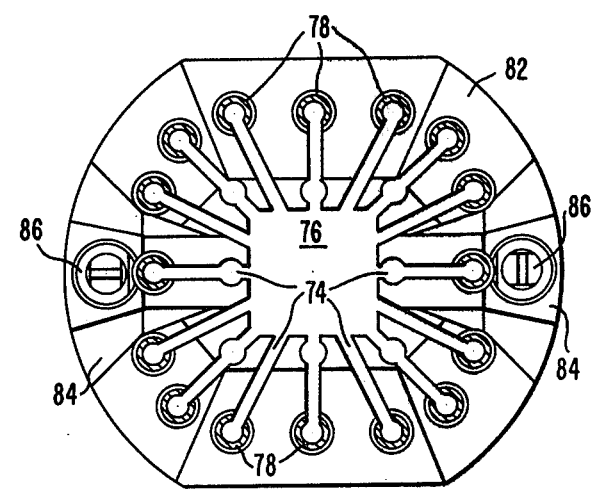
FIG. 3
FIG. 4
FIG. 5

GUIDE TUBE FLOW DIFFUSER

BACKGROUND OF THE INVENTION

This invention relates to nuclear reactors and more particularly to control rod guidance apparatus.

In nuclear reactor designs that are well known in the art, the reactor includes a reactor vessel having an inlet and an outlet with a closure head disposed on the top thereof. A core disposed within the reactor vessel consists of an array of fuel assemblies and control assemblies which produce heat in a commonly understood fashion. The fuel assemblies comprise an array of fuel elements which may be cylindrical metal tubes sealed at both ends and containing nuclear fuel while the control assemblies comprise fuel elements and guide thimbles capable of accommodating control rods for controlling the reactivity level of the reactor. The control assemblies are interspersed among the fuel assemblies. The fuel assemblies and control assemblies are supported at their lower end by a lower core plate and at their upper end by an upper core plate while a cylindrical metal member with an open top and bottom, known as a core barrel, surrounds the array of assemblies. The outer surface of the core barrel together with the inner surface of the reactor vessel define an annular passage therebetween. The lower core plate is supported within the reactor core by a support structure attached to the inner wall of the reactor vessel in a manner to support the core within the reactor vessel while the upper core plate is suspended above the core by support columns that extend downward from an upper support plate which is attached to the closure head. The upper support plate and upper core plate define an outlet plenum therebetween. Control rod guide tubes are attached to the upper core plate at locations corresponding to the location of the control assemblies in the core so that control rods may be guided by the guide tubes into the control assemblies.

During reactor operation, a coolant is circulated through the reactor vessel passing in heat transfer relationship with the fuel assemblies and control assemblies thereby removing the heat produced by the assemblies and carrying the heat to electrical generating equipment as is well known in the art. The coolant enters the reactor vessel through the inlet nozzle, flows downwardly through the annulus between the core barrel and the reactor vessel and into the plenum located below the reactor core. The coolant then flows upwardly through the core and in and around the fuel assemblies and control assemblies. The portion of the coolant flowing through the fuel assemblies continues to flow upwardly into the outlet plenum while the portion of the coolant flowing through the control assemblies flows upwardly into the guide tubes and exits the guide tubes radially through side openings in the guide tubes, thus flowing into the outlet plenum. The coolant then exits the reactor vessel through the outlet nozzle.

While the side openings in the guide tubes permit the coolant to exit the guide tubes, the radial flow of coolant produces turbulence that inhibits the movement of the control rods. Since one of the more important purposes of the guide tubes is to provide guidance for the control rods during their travel through the outlet plenum, it is necessary to avoid such turbulent flow that would hinder the operation of the control rods.

In U.S. Pat. No. 3,940,311 to E. Frisch et al, issued Feb. 24, 1976 and assigned to the assignee of the present invention, there is described the use of guide tubes located in the outlet plenum of a nuclear reactor that are used to guide control rods. While the patent to Frisch incorporates the use of side openings in the guide tubes, it does not address the problem of limiting the turbulence in the area near the control rod guidance system.

SUMMARY OF THE INVENTION

Nuclear reactor upper internal guide tubes having a flow diffuser integral with its bottom end. The guide tube consists of a shroud that extends from the upper support plate down to the upper core plate. The shroud which has side openings therein that allow coolant to exit therefrom encloses control rod guides that provide guidance for control rods during their travel through the outlet plenum of the nuclear reactor. The flow diffuser is integral with the shroud near the bottom end of the shroud and serves to divert the upward flow of reactor coolant around the outside of the shroud, thereby reducing the amount of coolant passing through the shroud and out the side openings in the shroud. Limiting the flow of coolant exiting through the side openings in the shroud reduces the amount of turbulence in the shroud near the control rod guides and reduces the radial forces on the control rods and guide tubes thus enhancing the ease of movement of the control rods.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 3 is a view in elevation of a guide tube;

FIG. 4 is a view taken along line IV—IV of FIG. 3;

FIG. 5 is a view taken along line V—V of FIG. 3; and

DESCRIPTION OF THE PREFERRED EMBODIMENT

Many nuclear reactor designs incorporate guide tubes located above the reactor core to provide guidance for control rods during their travel. Since a portion of the reactor coolant may flow upwardly through the guide tubes, side openings are provided therein to allow the coolant to exit therefrom. This exiting flow along with cross-flow patterns established by adjacent guide tubes creates radial forces on the control rods which may hinder their movement. The invention disclosed herein limits the flow through the guide tubes thereby reducing such radial forces.

Figure 1:
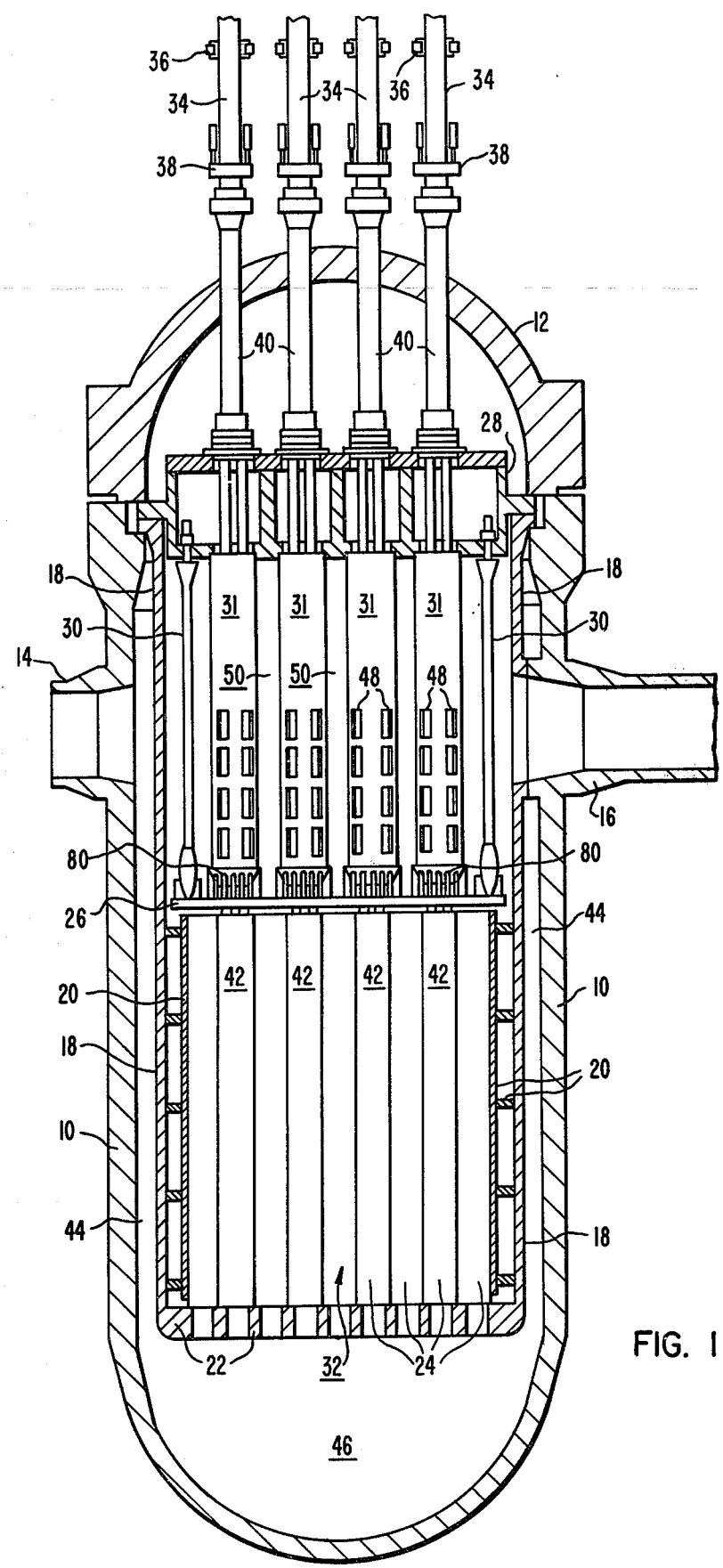
FIG. 1 is a cross-sectional view in elevation of a nuclear reactor.

Referring to FIG. 1, a reactor vessel 10 has a closure head 12 disposed on the top thereof with an inlet nozzle 14 and an outlet nozzle 16 disposed on the walls of reactor vessel 10. A substantially cylindrical core barrel 18 is suspended from a ledge of reactor vessel 10 near closure head 12. Core barrel 18 has a baffle 20 attached to the inside thereof. A lower core plate 22 having holes therein for accommodating the lower ends of fuel assemblies 24 is attached to the lower end of core barrel 18 and supported thereby. An upper core plate 26 having holes therein for accommodating the top ends of fuel assemblies 24 is supported from a deep-beamed upper support plate 28 by means of a plurality of support columns 30. A plurality of guide tubes 31 are also arranged between upper support plate 28 and upper core plate 26 in alignment with fuel assemblies 24. Fuel assemblies 24 are, therefore, supported within reactor vessel 10 between lower core plate 22 and upper core plate 26, thereby forming a reactor core 32.

Still referring to FIG. 1, the reactor is provided with fluid pressure operated control rod drive mechanisms 34 which may be of the type described in U.S. Pat. No. 3,607,629, to E. Frisch and H. Andrews issued Sept. 21, 1971 and assigned to the Westinghouse Electric Corporation. The control rods are raised by fluid pressure and are retained in the raised position by means of electromagnets 36 mounted on the control rod drive mechanisms. Control rod drive mechanisms 34 are attached by bolts (not shown) to upper flanges 38 on adapter tubes 40 which penetrate closure head 12 and are attached thereto by welding. Control rod drive mechanisms 34 serve to move the control rods (not shown) into and out of fuel assemblies 24 that are specially adapted to accommodate control rods so as to control the reactivity of core 32 in a manner well understood by those skilled in the art. These specially adapted fuel assemblies are generally referred to as control assemblies 42 and are arranged throughout core 32 in colinear alignment with guide tubes 31 so that the control rods (not shown) may be easily advanced from guide tubes 31 and inserted into control assemblies 42.

During reactor operation, the coolant enters reactor vessel 10 through inlet nozzle 14 and flows downwardly through annulus 44 defined between reactor vessel 10 and core barrel 18 into lower plenum 46 which is defined below lower core plate 22. The coolant flows from lower plenum 46 upwardly through lower core plate 22, in and around fuel assemblies 24 and control assemblies 42 where the coolant is heated by the heat produced by core 32. A portion of the coolant flows through the openings in upper core plate 26 while another portion flows upwardly into guide tubes 31. Generally, since control assemblies 42 are in colinear alignment with guide tubes 31, the coolant passing through control assemblies 42 continues upwardly into guide tubes 31. Side openings 48 are provided in guide tubes 31 in order to allow the coolant to exit therefrom. The coolant flowing up through upper core plate 26 and out through side openings 48 mixes together in outlet plenum 50 which is defined between upper core plate 26 and upper support plate 28. From outlet plenum 50, the coolant exits reactor vessel 10 through outlet nozzle 16 and is carried by piping to steam generating equipment located remote from the reactor.

Figure 2:
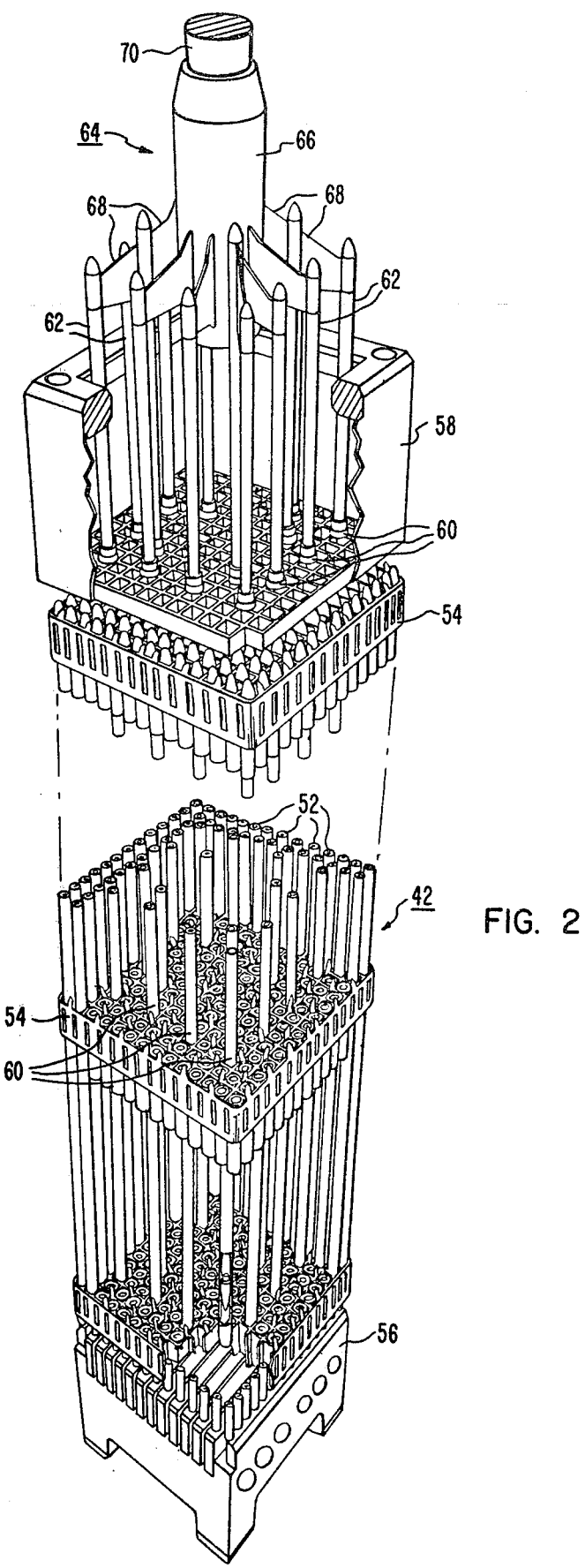
FIG. 2 is a view in perspective of a control assembly for a nuclear reactor.

Referring now to FIG. 2, control assemblies 42 comprise fuel elements 52, grids 54, lower nozzle 56, upper nozzle 58, and first guide thimbles 60. Fuel elements 52 may be elongated cylindrical metallic tubes containing nuclear fuel pellets and having both ends sealed by end plugs. The lower ends of fuel elements 52 are positioned in lower nozzle 56 while the upper ends are positioned in upper nozzle 58. First guide thimbles 60 which may number 16 are interspersed among the fuel elements 52 and may be hollow cylindrical metallic tubes capable of accommodating the insertion of control rods 62. Grids 54 are positioned at various locations along the lengths of control assembly 42 and serve to space fuel elements 52 and first guide thimbles 60 at appropriate distances from each other and to allow the reactor coolant to circulate in heat transfer relationship with fuel elements 52. A more detailed description of this type of grid may be found in U.S. Pat. Nos. 3,379,617 and 3,379,619, both issued in the name of H. N. Andrews et al. As can be seen in FIG. 2, control rods 62 are elongated cylindrical rods which can be manufactured out of boron carbide or other neutron absorber. Control rods 62 are arranged so as to be in colinear alignment with first guide thimbles 60 so that control rods 62 may be inserted in first guide thimbles 60 when it is desired to reduce the reactivity of core 32. Control rods 62 are supported from a common attachment known as a spider 64. Spider 64 comprises a body 66 with radially extending struts 68 extending from body 66. Control rods 62 are individually attached to each strut 68 to form an array as is well known in the art. Spider 64 is attached to drive shaft 70 which is connected to control rod drive mechanism 34. Activation of control rod drive mechanism 34 causes drive shaft 70 to be either lowered or raised, thereby inserting or withdrawing control rods 62 in core 32.

Referring now to FIGS. 3 and 4, adapter tube 40 and guide tube 31 are constructed so that drive shaft 70 and spider 64 along with control rods 62 may be easily moved therein. As shown in FIG. 4, spacers 72 are provided at various locations along the length of guide tube 31 to maintain proper alignment of control rods 62. Spacers 72 are metal plates having slots 74 therein conforming to the shape of struts 68 and having a center opening 76 that conforms to body 66. Split tube guides 78 which are elongated tubular metal members with a split side for accommodating struts 68 are disposed in the end of slots 74 so as to provide guidance for control rods 62 as control rods 62 are advanced through guide tubes 31. Thus, spacers 72 support split tube guides 78 within guide tubes 31 in appropriate arrangement to coincide with control rods 62 and struts 68, thereby providing continuous guidance for control rods 62.

Figure 6:
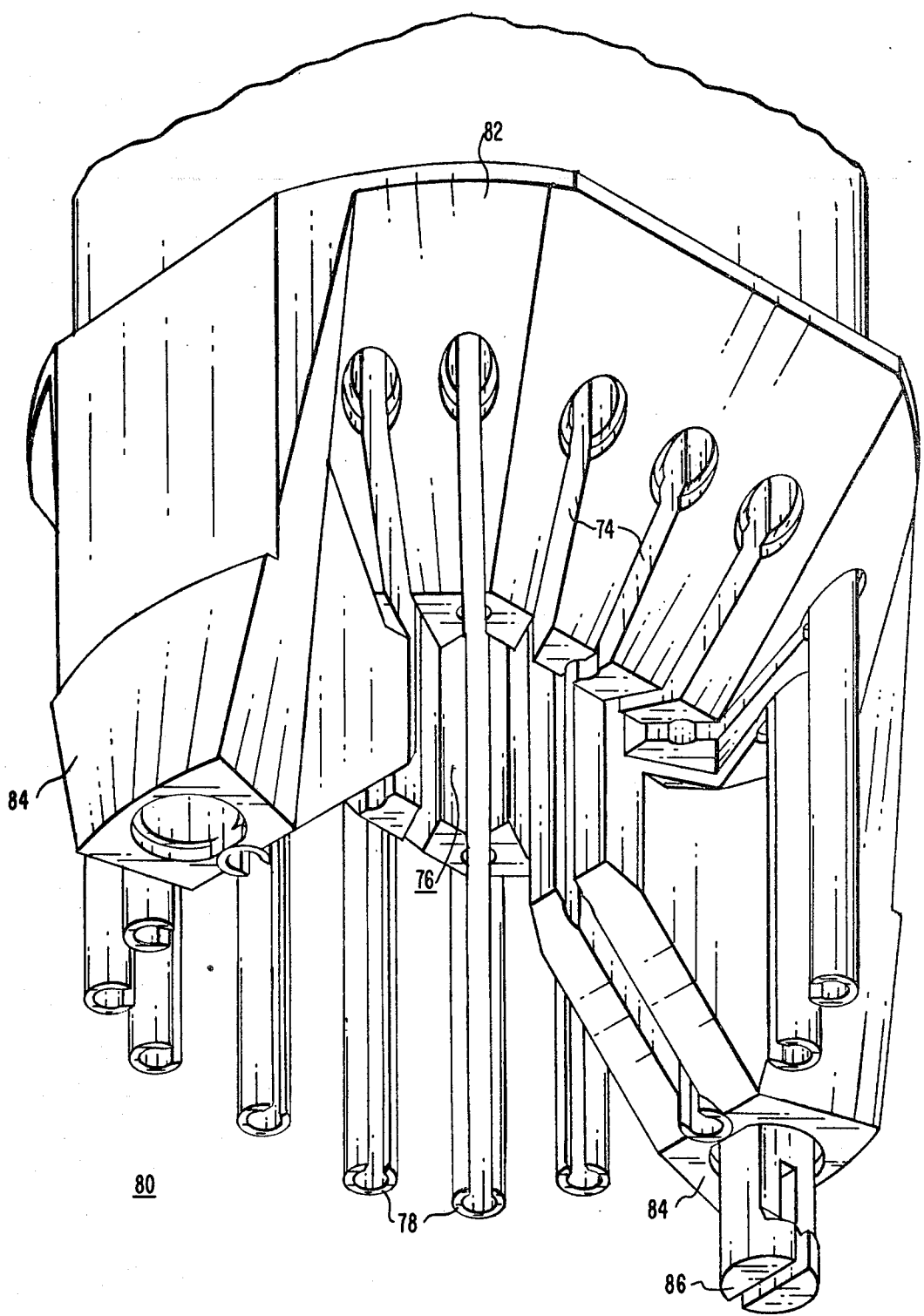
FIG. 6 is a view in perspective of a flow diffuser for a guide tube.

Referring now to FIGS. 3, 5, and 6, guide tube 31 has a flow diffuser 80 integral with its bottom end. Flow diffuser 80 comprises a member 82 formed to deflect the flow of a fluid such as a frustrum shaped member or a tapered truncated conical member with two legs 84 attached thereto. Legs 84 have pins 86 disposed therein that are compatible with upper core plate 26 so that when pins 86 have been inserted into corresponding holes in upper core plate 26, guide tubes 31 thereby suspend upper core plate 26 above fuel assemblies 24. Moreover, when so arranged, guide tubes 31 are in alignment with control assemblies 42 of core 32. As can be seen from the drawings, center opening 76 and struts 74 of spacer 72 are also present in member 82 so as to provide continuous guidance for control rods 62 throughout the entire length of guide tubes 31. Likewise, split tube guides 78 extend the length of guide tube 31 down to near the top of upper core plate 26. It is important to have split tube guides 78 in alignment with first guide thimbles 60 so that control rods 62 may be guided through split tube guides 78 into first guide thimbles 60, thereby entering core 32 as needed. Substantial misalignment between split tube guides 78 and first guide thimbles 60 would be unacceptable from an operational standpoint. Therefore, one of the important purposes of guide tubes 31 is to provide guidance for control rods 62 so that they may be properly inserted into first guide thimbles 60. It should be noted that split tube guides 78 and first guide thimbles 60 are not made into a single guide tube so that guide tubes 31 and upper core plate 26 may be removed, thereby exposing core 32 in a manner to facilitate refueling of the reactor in a manner that is well understood in the art.

Since guide tube 31 is located directly above control assemblies 42, the reactor coolant that flows upwardly in and around control assemblies 42 passes through the openings in upper core plate 26 and contacts flow diffuser 80. Because member 82 is frustrum-shaped, it has angled sides that deflect and diffuse the upward flowing coolant, thereby causing the coolant to flow around guide tube 31. However, body 82 does not deflect all of the coolant flow. Approximately 10 percent of the coolant flow contacting body 82 passes through center opening 76 around drive shaft 70, through slots 74 and split tube guides 78, around struts 68 and control rods 62. This portion of the coolant exits guide tubes 31 through side openings 48. Because only 10 percent of the contacting coolant flow enters guide tubes 31, the turbulence within guide tubes 31 is greatly reduced. Furthermore, the flow exiting guide tubes 31 through side openings 48 is also greatly reduced which, in turn, greatly reduces the radial forces exerted on split tube guides 78, drive shaft 70, struts 68, and control rods 62. By so reducing turbulence and radial forces on these mechanisms, the guidance and travel of control rods 62 is substantially increased. Therefore, the invention provides a guide tube located in the outlet plenum of a nuclear reactor with a flow diffuser integral with its bottom end to divert coolant flow around the guide tubes to thereby reduce radial forces on the control rods within the guide tubes and thus improve the guidance of the control rods.

We claim:

1. A nuclear reactor having a guide tube flow diffuser including a reactor vessel with a closure head disposed thereon, an array of fuel assemblies and control assemblies mounted within said reactor vessel between a lower core plate and an upper core plate, an inlet and an outlet disposed on said reactor vessel for circulating a coolant in heat transfer relationship with said fuel assemblies and said control assemblies, an upper support plate attached to said reactor vessel above said upper core plate defining an outlet plenum therebetween, a plurality of support columns supported by said upper support plate and extending downward to said upper core plate for supporting said upper core plate, comprising:

guide tubes extending from said upper support plate to said upper core plate for guiding control rods disposed therein;

spacers disposed within said guide tubes at intervals along the length of said guide tubes;

split tube guides attached to said spacers for providing guidance for said control rods;

side openings disposed in said guide tubes for allowing said coolant to exit from said guide tubes; and a conical shaped body having a center opening and radial slots therein for accommodating said control rods, said conical shaped body having a plurality of sloped sides terminating above said core plate and surrounding said center opening with said sloped sides having a flat lower surface substantially parallel to said core plate for diverting the upward flow of said coolant around the outside of said guide tubes, thereby reducing the flow of said coolant through said side openings and thus improving the guidance of said control rods;

legs having at least one sloped side extending from said body to near said upper core plate for providing attachment to said upper core plate; and pins disposed in said legs for engaging said upper core plate thereby maintaining proper alignment between said guide tubes and said upper core plate.

* * * * *